United States Patent
Yuan et al.

(10) Patent No.: US 8,867,471 B2
(45) Date of Patent: Oct. 21, 2014

(54) METHOD, DEVICE, AND SYSTEM FOR REPORTING RADIO ACCESS NETWORK ELEMENT INFORMATION

(75) Inventors: Liping Yuan, Shanghai (CN); Jin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 211 days.

(21) Appl. No.: 13/609,009

(22) Filed: Sep. 10, 2012

(65) Prior Publication Data

US 2012/0327893 A1 Dec. 27, 2012

Related U.S. Application Data

(63) Continuation of application No. PCT/CN2010/070963, filed on Mar. 10, 2010.

(51) Int. Cl.
*H04W 4/00* (2009.01)
*H04W 24/10* (2009.01)

(52) U.S. Cl.
CPC .................................. *H04W 24/10* (2013.01)
USPC ............................ 370/329; 455/436; 370/331

(58) Field of Classification Search
USPC .................................. 370/329, 331; 455/436
See application file for complete search history.

(56) References Cited

U.S. PATENT DOCUMENTS

| | | | |
|---|---|---|---|
| 6,445,917 B1 * | 9/2002 | Bark et al. ..................... | 455/423 |
| 8,274,950 B2 * | 9/2012 | Lee et al. ...................... | 370/332 |
| 8,305,997 B2 * | 11/2012 | Virkki et al. .................. | 370/332 |
| 8,660,559 B2 * | 2/2014 | Tamura et al. ................ | 455/436 |
| 2007/0192055 A1 * | 8/2007 | Tsujino et al. ................ | 702/150 |
| 2008/0188241 A1 * | 8/2008 | Mo et al. ..................... | 455/456.3 |
| 2008/0311927 A1 | 12/2008 | Boman et al. | |
| 2010/0048224 A1 | 2/2010 | Klatt | |
| 2010/0173633 A1 * | 7/2010 | Catovic et al. ................ | 455/436 |
| 2011/0098048 A1 | 4/2011 | Zhang et al. | |

FOREIGN PATENT DOCUMENTS

| | | |
|---|---|---|
| CN | 101076979 A | 11/2007 |
| CN | 101309513 A | 11/2008 |
| CN | 101491133 A | 7/2009 |
| CN | 101588258 A | 11/2009 |

(Continued)

OTHER PUBLICATIONS

First Office Action of Chinese Application No. 201080001640.4 mailed May 24, 2013, 19 pages. (Partial Translation).

(Continued)

*Primary Examiner* — Kenny Lin
(74) *Attorney, Agent, or Firm* — Slater & Matsil, L.L.P.

(57) ABSTRACT

A method for reporting radio access network element information includes: acquiring reporting policy information, where the reporting policy information includes set reporting content and a set reporting condition (101); and if the reporting condition is satisfied, reporting a radio access network element information report to a control network element by using signaling according to the reporting content that includes location information and corresponding time information or reporting a radio access network element information report to a gateway device by using a tunnel according to the reporting content that includes location information (102). In embodiments of the present invention, reporting policy information, for example, reporting content and a reporting condition, may be configured flexibly according to a scenario, and when the reporting condition is satisfied, a radio access network element information report may be reported to a control network element or a gateway device according to the reporting content.

23 Claims, 9 Drawing Sheets

(56) References Cited

FOREIGN PATENT DOCUMENTS

| CN | 101594606 A | 12/2009 |
|---|---|---|
| EP | 2 150 069 A1 | 2/2010 |
| EP | 2 285 150 A1 | 2/2011 |

OTHER PUBLICATIONS

CSR, "LCS for LTE: Summary of timestamping issue and proposals," 3GPP TSG-RAN WG2 #68, R2-097072, Jeju, Korea, Nov. 9-13, 2009, 6 pages.

Extended European Search Report received in Application No. 10847197.0-2414 mailed Jan. 28, 2013, Applicant: Huawei Technologies Co., Ltd., 9 pages.

International Search Report received in Patent Cooperation Treaty Application No. PCT/CN2010/070963, mailed Nov. 29, 2010, 4 pages.

Written Opnion of the International Searching Authority received in Patent Cooperation Treaty Application No. PCT/CN2010/070963, mailed Nov. 29, 2010, 9 pages.

"$3^{rd}$ Generation Partnership Project; Technical Specification Group Service and System Aspects; General Packet Radio Service (GPRS) enhancements for Evolved Universal Terrestrial Radio Access Network (E-UTRAN) access (Release 8)," 3GPP TS 23.401 V8.8.0, Dec. 2009, 239 pages.

\* cited by examiner

METHOD, DEVICE, AND SYSTEM FOR REPORTING RADIO ACCESS NETWORK ELEMENT INFORMATION

CROSS-REFERENCE TO RELATED APPLICATIONS

This application is a continuation of International Application No. PCT/CN2010/070963, filed on Mar. 10, 2010, which is hereby reference in its entirety.

TECHNICAL FIELD

Embodiments of the present invention relate to the field of communications technologies, and in particular, to a method, a device, and a system for reporting radio access network element information.

BACKGROUND

FIG. 1 is a schematic diagram of a network structure of an existing third generation partnership project (Third Generation Partnership Project, abbreviated to 3GPP) communication system. A radio access network, for example, a universal mobile telecommunications system (Universal Mobile Telecommunications System, abbreviated to UMTS) terrestrial radio access network (UMTS Terrestrial Radio Access Network, abbreviated to UTRAN) or a GSM/EDGE radio access network (GSM/EDGE Radio Access Network, abbreviated to GERAN), is used to implement radio-related functions; and a core network (Core Network, abbreviated to CN) is used to implement functions of switching and routing with an external network. The UTRAN includes a base station (Node B) and a radio network controller (Radio Network Controller, abbreviated to RNC). The GERAN includes a base transceiver station (Base Transceiver Station, abbreviated to BTS) and a base station controller (Base Station). The CN includes a packet switched (Packet Switched, abbreviated to PS) domain, which is capable of supporting voice and data services. The PS domain includes a serving general packet radio service supporting node (Serving GPRS Supporting Node, abbreviated to SGSN), a gateway general packet radio service supporting node (Gateway GPRS Supporting Node, abbreviated to GGSN), and so on. The GGSN is mainly responsible for interfacing with an external network and implementing transmission of user plane data. A core function of the SGSN is to implement route forwarding, mobility management, session management, user information storage, and so on. In addition, the CN further includes a home location register (Home Location Register, abbreviated to HLR), which is used to store user subscription information.

Long term evolution (Long Term Evolution, abbreviated to LTE) and system architecture evolution (System Architecture Evolution, abbreviated to SAE) are next generation mobile networks developed by the 3GPP. FIG. 2 is a schematic diagram of existing LTE and SAE networks. As shown in FIG. 2, the LTE is formed by an E-UTRAN (evolved-UTRAN). The E-UTRAN includes an evolved base station (eNodeB, abbreviated to eNB) network element, which is used to implement radio-related functions. The SAE is formed by a mobility management entity (Mobility Management Entity, abbreviated to MME), a serving gateway (Serving Gateway, abbreviated to SGW), a packet data network gateway (Packet Data Network Gateway, abbreviated as PGW), and a home subscriber server (Home Subscriber Server, abbreviated to HSS). The MME is a control network element in a PS domain, and is used to implement mobility-related functions such as authentication, mobility management, and session management. The SGW and the PGW are gateways and have different functions due to different locations in a network. Basic functions of the SGW and the PGW are to perform session management, data forwarding, and charging information collection. In addition, the SGW is connected to the eNB, and is capable of converging eNB connections; and the PGW is connected to an external network such as a PDN. Generally, the NodeB/RNC, the BTS/BSC and the eNB are collectively referred to as radio access network elements.

In a 3GPP network, a method for a gateway device to acquire radio location information of a UE is: A message sent by the gateway device to a mobility management network element indicates reporting location information of the UE, the mobility management network element sends a location report control message to a radio access network element, and the radio access network element may report a current location of a terminal user, and, for example, may also perform reporting for many times whenever the location of the terminal user changes.

It can be known from the foregoing, in a method for a radio access network element to report location information by using signaling in the prior art, reported content is single and a condition cannot be configured flexibly. It is particularly important that, in an existing network, if a location that needs to be reported, for example, a cell, has a small range, location information is frequently reported when a location of a UE slightly changes, which not only produces a heavy load on a network element that the signaling passes through and occupies excessive network resources, but also affects normal service processing, for example, fails to process a new network access request.

SUMMARY OF THE INVENTION

The present invention provides a method, a device, and a system for reporting radio access network element information, so as to solve such defects in the prior art that reported content is single, a condition cannot be configured flexibly, and excessive network resources are occupied, so that content that needs to be reported may be configured flexibly according to a scenario, thereby decreasing a network load and reasonably utilizing a network resource.

An embodiment of the present invention provides a method for reporting radio access network element information, where the method includes: acquiring reporting policy information, where the reporting policy information includes set reporting content and a set reporting condition; and if the reporting condition is satisfied, reporting a radio access network element information report to a control network element by using signaling according to the reporting content that includes location information and corresponding time information or reporting a radio access network element information report to a gateway device by using a tunnel according to the reporting content that includes location information.

An embodiment of the present invention further provides a method for reporting radio access network element information, where the method includes: sending reporting policy information to a radio access network element, where the reporting policy information includes set reporting content and a set reporting condition; and if the reporting condition is satisfied, receiving a radio access network element information report that is reported by the radio access network element by using signaling according to the reporting content that includes location information and corresponding time information or a radio access network element information report that is reported by using a tunnel according to the reporting content that includes location information.

An embodiment of the present invention further provides a radio access network element, including: a policy acquiring module, configured to acquire reporting policy information, where the reporting policy information includes set reporting content and a set reporting condition; and a reporting module, configured to, if the reporting condition is satisfied, report a radio access network element information report to a control network element by using signaling according to the reporting content that includes location information and corresponding time information or report a radio access network element information report to a gateway device by using a tunnel according to the reporting content that includes location information.

An embodiment of the present invention further provides a control network element, including: a policy sending module, configured to send reporting policy information to a radio access network element, where the reporting policy information includes set reporting content and a set reporting condition; and a report receiving module, configured to, if the reporting condition is satisfied, receive a radio access network element information report that is reported by the radio access network element by using signaling according to the reporting content that includes location information and corresponding time information.

An embodiment of the present invention further provides a radio communication network system, including the radio access network element and a core network element, where the core network element includes: the control network element and a gateway device; and the gateway device is configured to send reporting policy information to the control network element, and receive and process a radio access network element information report that is reported by the radio access network element by using a tunnel according to reporting content that includes location information.

With the method, the device, and the system for reporting radio access network element information provided in the present invention, reporting policy information, for example, reporting content information and reporting condition or one of the two, may be configured flexibly according to a scenario, and when the reporting condition is satisfied, a corresponding radio access network element information report may be sent to a control network element or a gateway device according to the reporting content information, thereby decreasing a network load, reducing occupation of a network resource, and reasonably utilizing the network resource. Meanwhile, diversity of reporting content further improves a service capability of a network.

BRIEF DESCRIPTION OF THE DRAWINGS

To describe the technical solutions in the embodiments of the present invention or the prior art more clearly, the accompanying drawings used in the description of the embodiments or the prior art are briefly introduced in the following. Evidently, the accompanying drawings in the following description are some embodiments of the present invention, and persons of ordinary skill in the art may also obtain other drawings according to these accompanying drawings without creative efforts.

DETAILED DESCRIPTION OF ILLUSTRATIVE EMBODIMENTS

To make the objectives, technical solutions, and advantages of the embodiments of the present invention clearer, the technical solutions in the embodiments of the present invention are described clearly and completely in the following with reference to the accompanying drawings in the embodiments of the present invention. Evidently, the embodiments to be described are only a part rather than all of the embodiments of the present invention. Based on the embodiments of the present invention, all other embodiments obtained by persons of ordinary skill in the art without creative efforts shall fall within the protection scope of the present invention.

Figure 1:
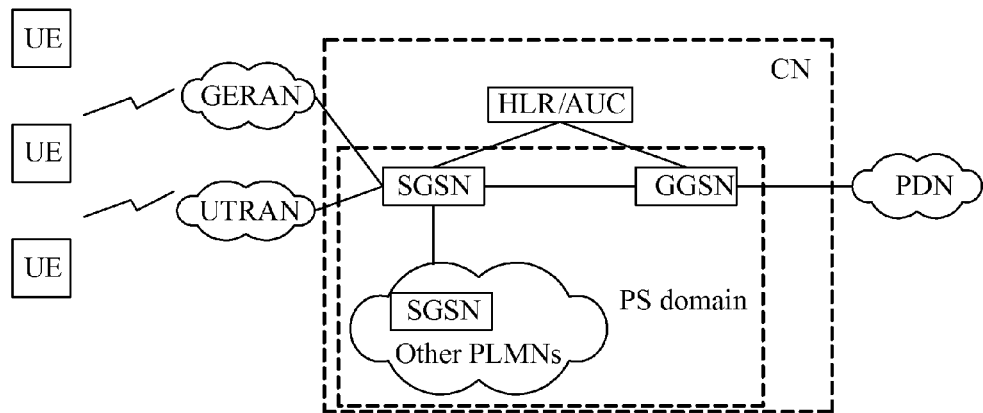
FIG. 1 is a schematic diagram of a network structure of an existing 3GPP communication system.
Figure 2:
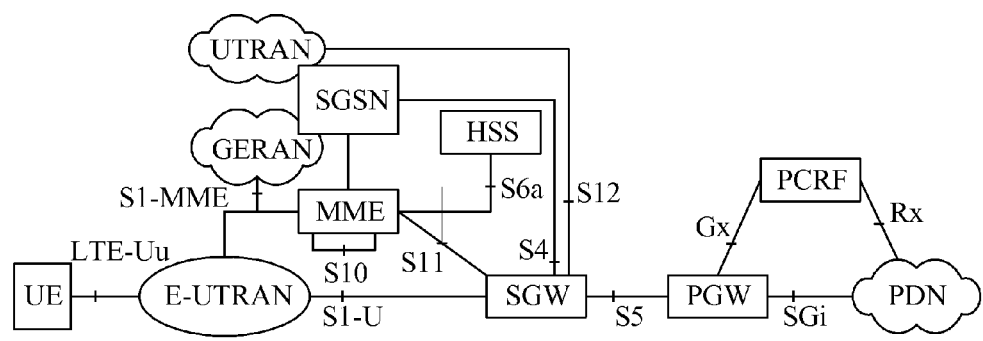
FIG. 2 is a schematic diagram of existing LTE and SAE networks.
Figure 3:
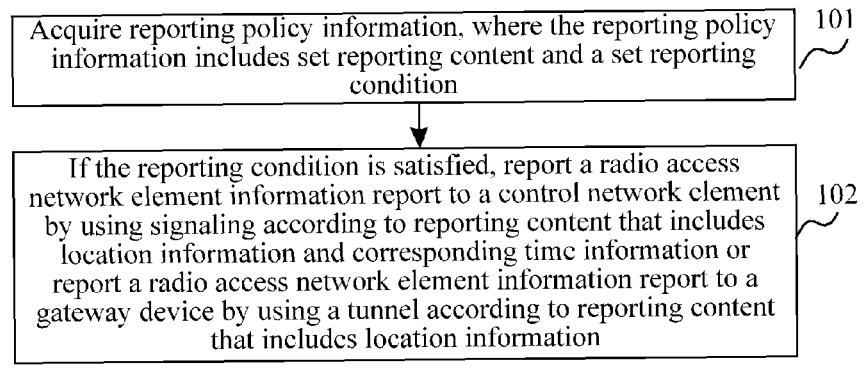
FIG. 3 is a flow chart of a method for reporting radio access network element information according to a first embodiment of the present invention.

FIG. 3 is a flow chart of a method for reporting radio access network element information according to a first embodiment of the present invention. As shown in FIG. 3, the method for reporting radio access network element information includes:

Step 101: Acquire reporting policy information, where the reporting policy information includes set reporting content and a set reporting condition.

Because reporting policy information may be set in a core network element, the core network element sets, according to a service requirement, content and a condition or one of the two that need to be reported by a radio access network element, and may inform the radio access network element of the content and the condition or one of the two through a message, for example, signaling or a special indication of a user plane tunnel. The reporting condition may be reporting at specified time or event-triggering reporting, where the event-triggering reporting includes reporting when an event that a bearer is released, a terminal leaves a current location, or the terminal enters an idle state occurs. The reporting content includes location information, for example, a cell or a geographic location where a UE is currently located. The reporting content may further include time information, for example, the time at which the UE is located at the location and a maximum time delay that can be supported by an eNB. The reporting content may further include traffic information, for example, traffic-related information such as traffic that has been consumed by the UE, discarded traffic, traffic information for distinguishing a service flow, traffic information and a load state of a location area where the UE is located, and a maximum bandwidth that can be supported by the eNB. The reporting policy information may further include a service flow template for submitting a radio access network element information report of the reporting content. If a gateway needs to know service flow-level information, a service flow template for which statistics need to be collected by the radio access network element may be carried in the reporting policy information and sent to the radio access network element, and the radio access network element matches, by using the service flow template, a data flow that passes through the radio access network element, and collects statistics on successfully matched content according to a policy requirement. The reporting content and the reporting condition that are included in the reporting policy information may be independent or combined randomly, and the radio access network element may also report other content to the core network element according to different scenarios, and at this time, relevant information of the reporting content may be correspondingly increased or reduced in the reporting policy information.

In addition, the reporting condition and the reporting content may be placed in the same information, and may also be placed in different types of information. For example, an information type may be requesting for reporting at least any one of the following: location information, radio access network element state information, and service information. The location information includes at least any one of the following: information of a cell where a user is located, information of a service area or radio access network element information, and information of a handover cell or base station. The radio network element state information includes at least any one of the following: congestion, flow control, and load information of the cell, the service area, or the radio access network element. The service information includes at least data traffic information of a service of the user, downlink data traffic information that fails to be sent, and information of time at which the user uses a service. The data traffic information of a service of the user may include data traffic information generated when the user uses a certain service or all services in a certain cell, service area, or radio access network element. The information of time at which the user uses a service may include information of a time point at which the user enters or leaves a certain cell, service area, or radio access network element when using the service.

The reporting condition and the reporting content may further be sent through different messages. The reporting policy information may also be set in the radio access network element, and does not need to be delivered by the core network element. Therefore, a method for acquiring the reporting policy information includes: acquiring the reporting policy information from the radio access network element locally; or acquiring the reporting policy information sent by a control network element.

The core network element may include a control device or a gateway device. Radio access network elements, control network elements, and gateway devices are different in different radio communication networks. For example, in LTE and SAE networks, the radio access network element may be an evolved base station eNB, the control network element may be a mobility management entity MME, and the gateway device may be a serving gateway SGW or a packet data network gateway PGW; and in a UMTS network, the radio access network element may be a radio network controller RNC, the control network element may be a serving general packet radio service supporting node SGSN, and the gateway device may be a gateway general packet radio service supporting node GGSN.

A method for receiving, by the radio access network element, the reporting policy information sent by the control network element may specifically include the following situations: receiving a bearer setup message that carries the reporting policy information and is forwarded by the control network element, where if the control network element is a mobility management entity, the bearer setup message is an initial context setup request message; and if the control network element is a serving general packet radio service supporting node, the bearer setup message is a radio access bearer setup request message; or receiving an access information request message that carries the reporting policy information and is forwarded by the control network element; or receiving a create tunnel request message or a register request message, where the create tunnel request message or the register request message is forwarded by the control network element, and carries a user identity and the reporting policy information.

In addition, in a radio communication network, movement of a location of a user equipment or a change of a service may cause a handover of the radio access network element or the control network element, if the radio access network element hands over from an original radio access network element to a new radio access network element, in the method for reporting radio access network element information, a method for the new radio access network element to acquire the reporting policy information may include the following several examples.

Example 1

The new radio access network element receives, from an inter-radio network element interface, the reporting policy information sent by the original radio access network element; and at this time, if inter-radio network element interfaces, for example, Iur and X2, exist between the original radio access network element and the new radio access network element, the original radio access network element may send the reporting policy information to the new radio access network element through interfaces Iur and X2.

Example 2

After the original radio access network element sends a handover request message to the control network element, where the handover request message carries the reporting policy information, the new radio access network element receives the handover request message that carries the reporting policy information and is forwarded by the control network element; and at this time, if inter-radio network element interfaces Iur and X2 do not exist between the original radio access network element and the new radio access network element, the radio access network element may carry the reporting policy information in a radio access network element information container (transparent container) of the handover request message, and transfer the handover request message to the control network element through an Iu or S1 interface first, and then the control network element forwards the handover request message to the new radio access network element.

Example 3

The new radio access network element receives a request message that carries the reporting policy information and is sent by the control network element, where the reporting policy information is reporting policy information of the original radio access network element, where the reporting policy information of the original radio access network element is acquired last time and saved by the control network element; and at this time, if the control network element saves the reporting policy information of the original radio access network element, where the reporting policy information of the original radio access network element is acquired last time, the control network element may send a request message that carries the reporting policy information, such as a forward relocation request (Forward Relocation Request) message, a create tunnel request message, or a register request message to the new radio access network element.

Example 4

If the control network element hands over from an original control network element to a new control network element, the new radio access network element receives an update bearer response message that is sent by the gateway device and forwarded by the new control network element, where the update bearer response message carries the reporting policy information. At this time, both the radio access network element and the control network element hand over, the gateway device may re-deliver the update bearer response message to the radio access network element through the new control network element, where the update bearer response message carries the reporting policy information, and the radio access network element may return an acknowledge message (Acknowledge) to the gateway device through the new control network element.

Step 102: If the reporting condition is satisfied, report a radio access network element information report to a control network element by using signaling according to the reporting content that includes location information and corresponding time information or report a radio access network element information report to a gateway device by using a tunnel according to the reporting content that includes location information.

After acquiring the reporting policy information, the radio access network element may perform corresponding processing. Several processing scenarios are provided in the following.

Scenario 1: It is assumed that the reporting content included in the reporting policy information is that a current location of a UE and the time at which the UE is located at the location are required to be reported, and the reporting condition is when the UE enters a new location, for example, a cell (cell), the radio access network element may record the new location that the UE enters and the current time (which may be accurate to seconds), and may further record the time at which the UE leaves the location, and then report them to the core network element through a radio access network element information report.

Scenario 2: It is assumed that the reporting content included in the reporting policy information is that traffic of a UE is required to be reported, and the reporting condition is reporting at specified time, the radio access network element may acquire, according to bearer granularity or according to a service flow template, traffic of a service flow corresponding to the UE, and then report the traffic to the core network element through a radio access network element information report when the specified time arrives.

Scenario 3: It is assumed that the reporting content included in the reporting policy information is that load information of a cell where a UE is located is required to be reported, the radio access network element may record load information of a cell where a current location of the UE is, and then report the information to the core network element through a radio access network element information report when the reporting condition is satisfied.

Reporting content and reporting conditions in various scenarios may be combined freely. When the reporting condition is satisfied, for example, when an event that the UE leaves the radio access network element or the UE enters a new location occurs or immediate reporting is required, the radio access network element may determine specific information in the radio access network element information report according to the reporting content. If the reporting content includes location information and corresponding time information, the radio access network element information report may include location information of each terminal in the radio access network element and time information of each terminal at a corresponding location. The specific information in the radio access network element information report corresponds to information in the reporting content, and may include location information, time information and/or traffic information. Embodiments of the present invention are merely illustrative, and are not intended to limit specific content and a specific combination manner of the reporting policy information and the radio access network element information report.

After receiving the radio access network element information report, the core network element may extract radio access network element information, for example, a relationship between a location and the time of a UE, a relationship between a location and traffic, a relationship between a location and a load, and so on, and then provide the information to an application layer or another function module, for location-based charging or charging traffic deduction, or for selecting a more proper access technology. For example, the core network element may establish a cell use-rate model according to location information of the UE and the time at which the UE enters and leaves the location, so as to provide input for radio network planning; the core network element may also specify different cell traffic models according to the relationship between the location and the traffic, for example, a bandwidth, a time delay, a packet loss ratio, so as to obtain further detailed traffic at a service level, and may also perform optimization for a service to ensure the quality of service for a user and improve customer experience; the core network element may also know, according to the location and the load, whether a current cell, service area, or radio access network element is congested, so as to preferentially ensure a service of an important customer through a measure such as improving a quality of service requirement; and the core network element may also instruct the user to hand over to a non-congested cell or select another access technology to avoid degradation of the quality of service, and may even alleviate or eliminate a congested state of the cell, service area, or radio access network element by limiting, suspending, or terminating use of some or all services by some or all users in the cell, service area or, radio access network element.

Figure 4A:
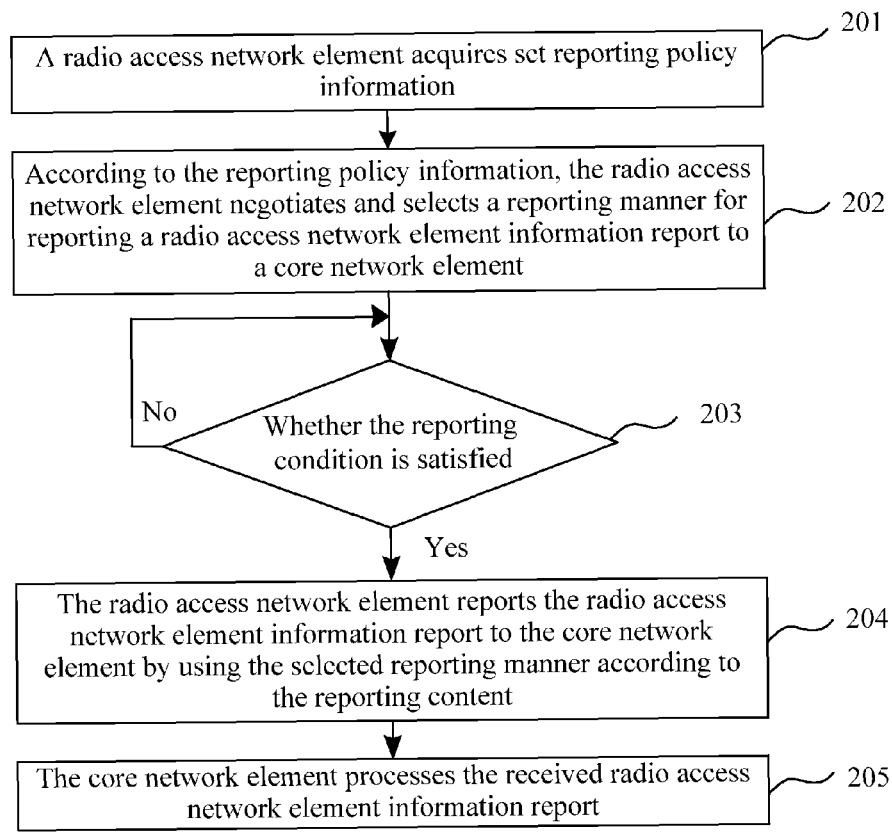
FIG. 4a is a flow chart of a reporting manner included in the method for reporting radio access network element information according to the first embodiment of the present invention.

Further, a reporting manner for the radio access network element to report the radio access network element information report may include a signaling or tunnel manner. The reporting manner may be preset in the radio access network element, and may also be acquired from radio access policy information. If the reporting policy information includes a reporting manner, which may also be simplified as a default manner in a specific network, for example, a signaling manner or a tunnel manner is used for reporting by default, that is, the reporting manner is optional, according to the reporting policy information, the radio access network element may report, in a centralized way, information to the core network element in the form of a radio access network element information report through a signaling or tunnel manner, where the information is preprocessed by an access network. The tunnel reporting manner may be a form of carrying radio access network element information in a header of a data packet or a payload of the data packet transmitted in a tunnel. A specific tunnel may be a general packet radio service (General Packet Radio Service, abbreviated as GPRS) tunneling protocol-user plane (GPRS Tunneling Protocol-User plane, abbreviated as GTP-U) tunnel, and may also be a mobile IP (MIP) tunnel. FIG. 4a is a flow chart of a reporting manner included in the method for reporting radio access network element information according to the first embodiment of the present invention. When reporting policy information includes a reporting manner, the method for reporting radio access network element information may specifically include the following steps.

Step 201: A radio access network element acquires set reporting policy information, where the reporting policy information may include reporting content, a reporting condition, and a reporting manner, and the reporting policy information may be acquired locally or received from a core network element.

Step 202: According to the reporting policy information, the radio access network element negotiates and selects a reporting manner for reporting a radio access network element information report to the core network element, for example, a control network element or a gateway device.

Step 203: The radio access network element judges whether the reporting condition is satisfied. If yes, perform step 204; otherwise, continue to perform step 203.

Step 204: The radio access network element reports the radio access network element information report to the core network element by using the selected reporting manner according to the reporting content.

Step 205: The core network element processes the received radio access network element information report.

Figure 4B:
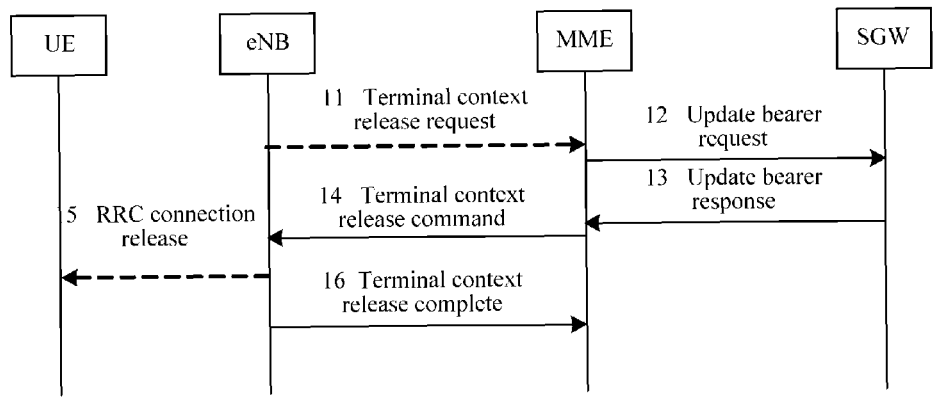
FIG. 4b is a signaling flow chart of reporting by using signaling in the method for reporting radio access network element information according to the first embodiment of the present invention.

A process that the radio access network element reports the radio access network element information report to the control network element or the gateway device may include:

Manner 1: If the reporting manner is signaling, send the radio access network element information report to the control network element by using signaling, for example, send the radio access network element information report that includes location information and corresponding time information to the control network element by using bearer release signaling or by using independent signaling after a terminal leaves a current location and the terminal enters an idle state. FIG. 4b is a signaling flow chart of reporting by using signaling in the method for reporting radio access network element information according to the first embodiment of the present invention. When a radio access network element is disconnected from a control network element, the following steps may be specifically included.

Step 11: A radio access network element eNB sends a terminal context release request (S1-AP: S1 UE Context Release Request) message to a control network element MME, where the terminal context release request message carries a radio access network element information report (Access Information Report).

Step 12: The control network element MME sends an update bearer request (Update Bearer Request) message to a gateway device SGW, where the update bearer request message carries the radio access network element information report.

Step 13: The SGW returns an update bearer response (Update Bearer Response) message to the MME.

Step 14: The MME sends a terminal context release command (S1-AP: S1 UE Context Release Command) message to the eNB.

Step 15: The eNB sends an RRC connection release (RRC Connection Release) message to a UE.

Step 16: The eNB sends a terminal context release complete (S1-AP: S1 UE Context Release Complete) message to the MME. It is assumed that step 11 is not performed or the update bearer request message in step 11 does not carry the radio access network element information report, the terminal context release complete request in step 16 may carry the radio access network element information report. Then, the MME may further send a change notification request (Change Notification Request) message to the gateway device SGW, where the change notification request carries the radio access network element information report.

Figure 4C:
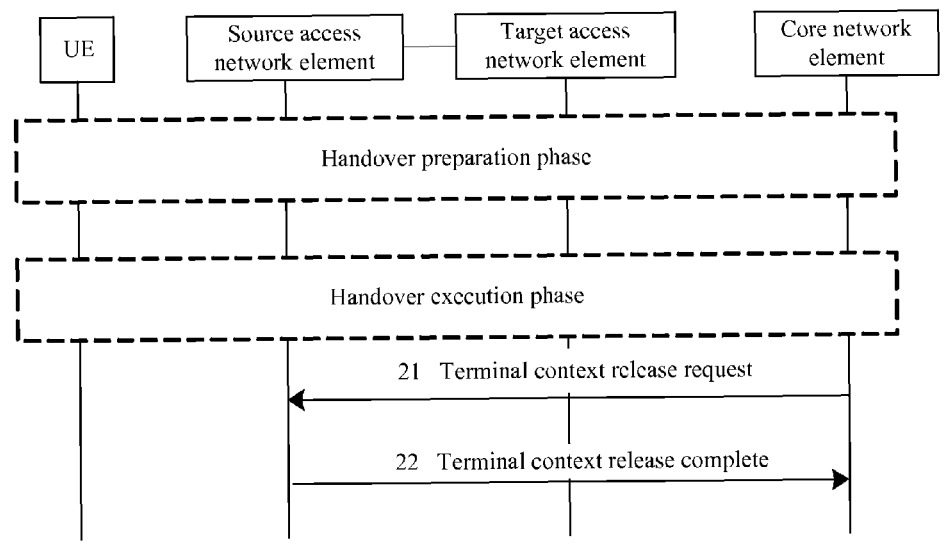
FIG. 4c is another signaling flow chart of reporting by using signaling in the method for reporting radio access network element information according to the first embodiment of the present invention.

FIG. 4c is another signaling flow chart of reporting by using signaling in the method for reporting radio access network element information according to the first embodiment of the present invention. When a UE hands over from a source access network element, for example, a source (Source) eNB, to a target access network element, for example, a target (Target) eNB, after a core network element sends a terminal context release request message to the source access network element in step 21, in step 22, the source access network element may send a terminal context release complete message to the core network element, for example, an MME, where the terminal context release complete message carries a radio access network element information report.

Manner 2: If the reporting manner is a user tunnel, send a data packet to a gateway device through a GTP-user plane (GTP-User plane, abbreviated as GTP-U) tunnel or a mobile IP tunnel, where the data packet carries the radio access network element information report, and the radio access network element information report is set in an extension header or a message type of the data packet. A method for adding a radio access network element information report to a data packet is illustrated in this embodiment by taking a GTP-user plane tunnel as an example. A method for adding a radio access network element information report to a data packet of a mobile IP tunnel is similar to a GTP-U tunnel manner, and is not described herein again.

Figure 4D:
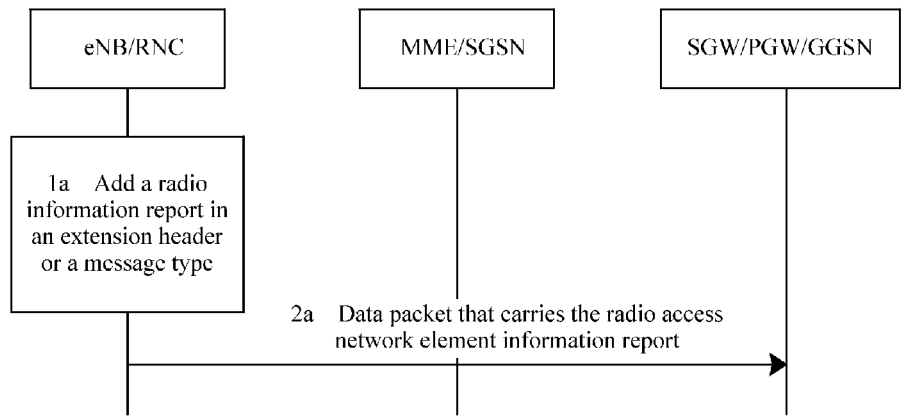
FIG. 4d is a signaling flow chart of reporting by using a GTP-U tunnel in the method for reporting radio access network element information according to the first embodiment of the present invention.

FIG. 4d is a signaling flow chart of reporting by using a GTP-U tunnel in the method for reporting radio access network element information according to the first embodiment of the present invention, which specifically includes:

Step 1a: A radio access network element, for example, an eNB/RNC, may add a radio access network element information report in an extension header or a message type of a GTP-U data packet.

Step 2a: Send the data packet to a gateway device SGW/PGW/GGSN through a GTP-U tunnel directly, where the data packet carries the radio access network element information report.

After the radio access network element adds a radio access network element information report in an extension header, for example, a Next Extension Header Type bit, of a transferred data packet on a tunnel that has been established by the terminal, for example, a default bearer, the radio access network element information report may be transferred to a PGW through an SGW or transferred to a GGSN through an SGSN over a GTP-U tunnel; and after identifying the extension header of the data packet, the gateway device PGW/GGSN may extract the radio access network element information report of the terminal from the extension header for processing, and then provide the report for another application such as charging.

Table 1 shows a format of an extension header of a data packet sent through a GTP-U tunnel.

TABLE 1

| Octets | Bits | | | | | | | |
|---|---|---|---|---|---|---|---|---|
| | 8 | 7 | 6 | 5 | 4 | 3 | 2 | 1 |
| 1 | Version | | | PT | (*) | 1 | S | PN |
| 2 | Message Type | | | | | | | |
| 3 | Length (1st Octet) | | | | | | | |
| 4 | Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence Number (1st Octet)1) 4) | | | | | | | |
| 10 | Sequence Number (2nd Octet)1) 4) | | | | | | | |
| 11 | N-PDU Number2) 4) | | | | | | | |
| 12 | Next Extension Header Type3) 4) | | | | | | | |

A format of adding a radio access network element information report in an extension header may be shown in the following Table 2.

TABLE 2

| Octets | |
|---|---|
| 1 | Extension Header Length |
| 2-m | Extension Header Content |
| m + 1 | Next Extension Header Type (note) |

Table 2 shows a representation method of an extension header following Table 1. For example, the Next Extension Header Type in Table 1 may be represented as a radio access network element information report, In Table 2, the length (Extension Header Length) and content (Extension Header Content) of the extension header and the next extension header type (Next Extension Header Type) are included, if a next extension header is not used, a value zero is assigned to the Next Extension Header Type in Table 2, and so on, and if Table 1 shows information of another extension header, an extension header of the radio access network element information report may be put in the next extension header in Table 2. The length and content of the extension header of the radio access network element information report may be set according to a specific situation in an network. The radio access network element information report is merely an exemplary name, and a specific name is not limited.

The radio access network element adds the radio access network element information report in a message type of a newly added GTP-U data packet and includes the content of the radio access network element information report in the GTP-U data packet. Table 3 shows an example of adding a radio access network element information report in a message type.

TABLE 3

| Message Type value (Decimal) | Message | Reference | GTP-C | GTP-U | GTP' |
|---|---|---|---|---|---|
| 1 | Echo Request | | X | X | x |
| 2 | Echo Response | | X | X | x |
| 3-25 | Reserved in 3GPP TS 32.295 [8] and 3GPP TS 29.060 [6] | | | | |
| 26 | Error Indication | | | X | |
| 27-30 | Reserved in 3GPP TS 29.060 [6] | | | | |
| 31 | Supported Extension Headers Notification | | X | X | |
| 32-252 | Reserved in 3GPP TS 29.060 [6] | | | | |
| 253 | Radio access network element information report | | | X | |
| 254 | End Marker | | | X | |
| 255 | G-PDU | | | X | |

A radio access network element, for example, an eNB or RNC, may send a data packet to a gateway device through a GTP-U tunnel, where the data packet carries a radio access network element information report; and after identifying the data packet, the gateway device extracts the radio access network element information report for processing, and provides the report for another application such as charging.

Manner 3: If the reporting manner is a device tunnel, a data packet that carries the radio access network element information report may further be sent to the gateway device through a device-level user plane tunnel, where the data packet further includes a user identity or a corresponding policy identity for creating the device-level user plane tunnel.

A radio access network element (RNC/eNB) establishes a device-level user plane tunnel with a core network element (SGW/SGSN and PGW/GGSN), and may transfer the radio access network element information report to the gateway device directly through the device-level user plane tunnel. To enable the gateway device, for example, the PGW, to identify data of a specific user, a format of a data packet may include a user identity, a policy identity, a radio access network element information report, and so on, where the user identity may be an IMSI, a temporary identity (Temporary identity) allocated by a gateway for a user; the policy identity is an optional format, and when the gateway allocates multiple policies for the user, the gateway device may identify, according to the policy identity, reporting content corresponding to different policies; and the radio access network element information report may be content of information received and processed by the gateway device in the form that is agreed by the gateway device with an access network element.

In conclusion, a form of setting reporting policy information and a manner for reporting a radio access network element information report may be combined randomly into a reasonable manner, for example, delivering the reporting policy information in a signaling manner and reporting the radio access network element information report in a tunnel manner, or configuring the reporting policy information in a radio access network element and reporting the radio access network element information report in a signaling manner, and so on.

In this embodiment, reporting policy information, for example, reporting content and a reporting condition, may be configured flexibly according to a scenario, and when the reporting condition is satisfied, a radio access network element information report may be reported to a control network element or a gateway device according to the reporting content, thereby reducing occupation of a network resource and reasonably utilizing the network resource. In addition, through a set reporting manner, a radio access network element may flexibly select to use signaling or a tunnel to report the radio access network element information report.

Figure 5:
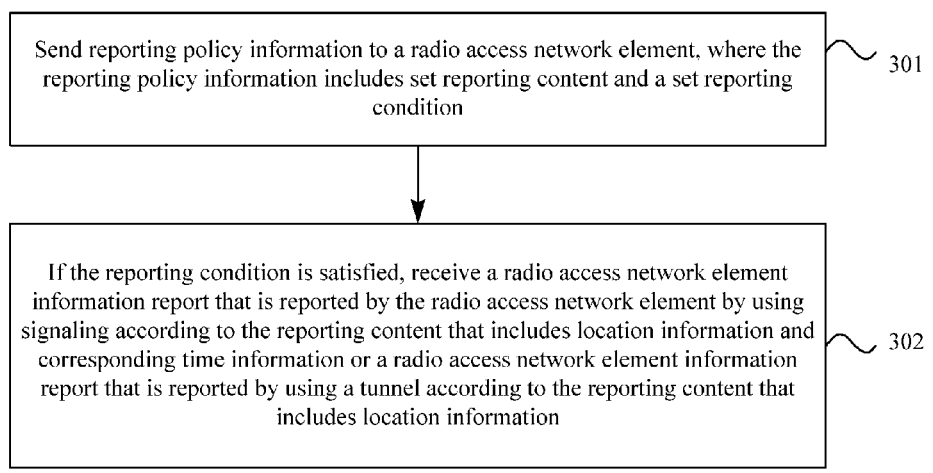
FIG. 5 is a flow chart of a method for reporting radio access network element information according to a second embodiment of the present invention.

FIG. 5 is a flow chart of a method for reporting radio access network element information according to a second embodiment of the present invention. As shown in FIG. 5, the method for reporting radio access network element information includes:

Step 301: Send reporting policy information to a radio access network element, where the reporting policy information includes set reporting content and a set reporting condition.

Step 302: If the reporting condition is satisfied, receive a radio access network element information report that is reported by the radio access network element by using signaling according to the reporting content that includes location information and corresponding time information or a radio access network element information report that is reported by using a tunnel according to the reporting content that includes location information.

Network elements in a core network may be classified into a control network element and a gateway device. The reporting policy information may be set in a control network element or a gateway device. If the reporting policy information is set in a gateway device, before step 301, the method may include: receiving the reporting policy information sent by the gateway device.

Radio access network elements, control network elements, and gateway devices are different in different radio communication networks. For example, in an LTE network, the radio access network element may be an evolved base station eNB, the control network element may be a mobility management entity MME, and the gateway device may be a serving gateway SGW or/and a packet data network gateway PGW; and in a UMTS network, the radio access network element may be a radio network controller RNC, the control network element may be a serving general packet radio service supporting node SGSN, and the gateway device may be a gateway general packet radio service supporting node GGSN. A process that a control network element receives reporting policy information sent by a gateway device may include: receiving a bearer setup message that carries the reporting policy information and is sent by the gateway device, where if the gateway device is the serving gateway or the packet data network gateway, the bearer setup message is a create session response message; and if the gateway device is the gateway general packet radio service supporting node, the bearer setup message is a create packet data protocol context response message; or receiving an access information request message that carries the reporting policy information and is sent by the gateway device; or receiving a create tunnel request message or a register request message, where the create tunnel request message or the register request message is sent by the gateway device, and carries a user identity and the reporting policy information.

Further, radio access network elements are different in different radio communication networks. For example, in an LTE network, the radio access network element may be an evolved base station (eNB), and in a UMTS network, the radio access network element may be a radio network controller (RNC). A process that after receiving reporting policy information delivered by the gateway device, the control network element correspondingly forwards the reporting policy information to the radio access network element may specifically include: forwarding a bearer setup message to the radio access network element, where the bearer setup message carries the reporting policy information, if the radio access network element is an evolved base station, the bearer setup message is an initial context setup request message, and if the radio access network element is a radio network controller, the bearer setup message is a radio access bearer setup request message; or forwarding an access information request message to the radio access network element, where the access information request message carries the reporting policy information; or forwarding a create tunnel request message or a register request message to the radio access network element, where the create tunnel request message or the register request message carries a user identity and the reporting policy information.

In this embodiment, reporting policy information, for example, reporting content and a reporting condition, may be configured flexibly according to a scenario, and when the reporting condition is satisfied, a control network element or a gateway device may receive a radio access network element information report that is reported by a radio access network element according to the reporting content, thereby decreasing a network load, reducing occupation of a network resource, and reasonably utilizing the network resource.

Figure 6A:
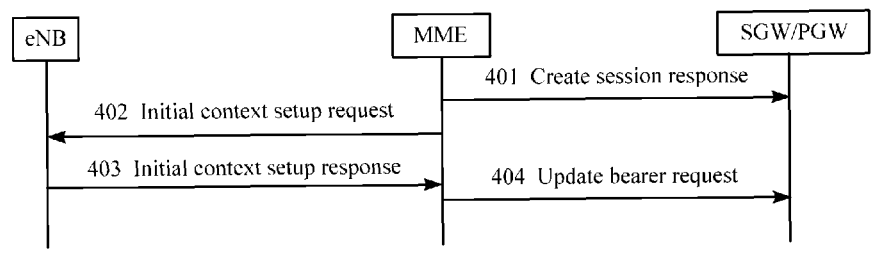
FIG. 6a is a signaling flow chart of a method for reporting radio access network element information applied in LTE and SAE networks according to a third embodiment of in the present invention.

In the method for reporting radio access network element information according to the second embodiment of the present invention, a bearer setup message is used for delivering reporting policy information. FIG. 6a is a signaling flow chart of a method for reporting radio access network element information applied in LTE and SAE networks according to a third embodiment of the present invention. As shown in FIG. 6a, in the LTE and SAE networks, a gateway device PGW/SGW is a core network element that delivers reporting policy information, a control network element MME is a core network element that forwards the reporting policy information, and a radio access network element eNB is an access network element that reports a radio access network element information report. The method for reporting radio access network element information may specifically include:

Step 401: A gateway device PGW/SGW carries reporting policy information (Access Policy Option) in a bearer setup message of an attachment procedure, for example, a create session response (Create Session Response) message, and sends the information to a control network element, for example, an MME. The PGW and the SGW may be one network element, and may also not be one network element, and when the two are not one network element, the PGW may forward the reporting policy information to the MME through the SGW.

Step 402: The MME forwards a bearer setup message, for example, an initial context setup request (Initial Context Setup Request) message, to a radio access network element, for example, an eNB, where the bearer setup message carries the reporting policy information.

Step 403: After acquiring the reporting policy information from the initial context setup request message, the eNB may return an initial context setup response (Initial Context Setup Response) message to the MME, where the initial context setup response message carries a policy acknowledge (Policy Acknowledge) indication. The policy acknowledge indication may be accepting a policy or rejecting a policy.

Step 404: If in step 403 the initial context setup response message that is sent by the eNB and received by the MME includes the policy acknowledge indication, the MME may send an update bearer request (Update Bearer Request) message to the SGW/PGW, where the update bearer request message carries the policy acknowledge indication.

Step 403 and step 404 are optional steps. Step 402 may not need a response by default, and at this time, steps 403 and 404 are not performed. If the MME receives a radio access network element information report returned by the eNB within a certain period of time, a policy is accepted by default; otherwise, a policy is rejected by default.

Figure 6B:
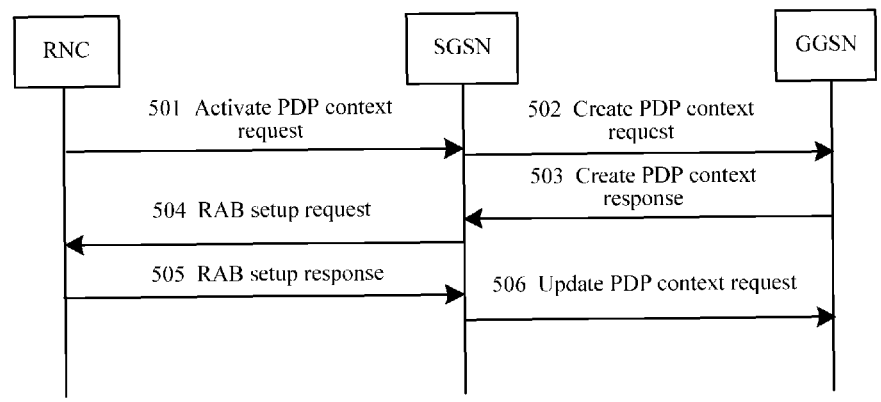
FIG. 6b is a signaling flow chart of the method for reporting radio access network element information applied in a UMTS network according to the third embodiment of the present invention.

FIG. 6b is a signaling flow chart of the method for reporting radio access network element information applied in a UMTS network according to the third embodiment of the present invention. As shown in FIG. 6b, in the UMTS network, a gateway device GGSN is a core network element that delivers reporting policy information, a control network element SGSN is a core network element that forwards the reporting policy information, and a radio access network element radio network controller (Radio Network Controller, abbreviated as RNC) is an access network element that reports a radio access network element information report.

Step 501: A control network element SGSN receives an activate packet data protocol (Packet Data Protocol, abbreviated as PDP) context request (Activate PDP Context Request) message sent by a radio access network element RNC.

Step 502: The SGSN sends a create PDP context request (Create PDP Context Request) message to a gateway device GGSN.

Step 503: The SGSN receives a bearer setup message, for example, a create PDP context response (Create PDP Context Response) message, where the bearer setup message carries reporting policy information (Access Policy option) and is returned by the GGSN.

Step 504: The SGSN delivers a bearer setup message, for example, a radio access bearer (Radio Access Bearer, abbreviated as RAB) setup request (RAB Setup Request) message, to the RNC, where the bearer setup message carries the reporting policy information.

Step 505: After acquiring the reporting policy information from the RAB setup request message, the RNC may return an RAB setup response (RAB Setup Response) message to the SGSN, where the RAB setup response message carries a policy acknowledge (Policy Acknowledge) indication. The policy acknowledge indication may be accepting a policy or rejecting a policy.

Step 506: If in step 505 the RAB setup response that is sent by the RNC and received by the SGSN includes the policy acknowledge indication, the SGSN may send an update bearer request message, for example, an update PDP context request (Update PDP Context Request) message, to the GGSN, where the update bearer request message carries the policy acknowledge indication.

Step 505 and step 506 are optional steps. Step 504 may not need a response by default, and at this time, steps 505 and 506 are not performed. If the SGSN receives a radio access network element information report returned by the RNC within a certain period of time, a policy is accepted by default; otherwise, a policy is rejected by default.

Figure 6C:
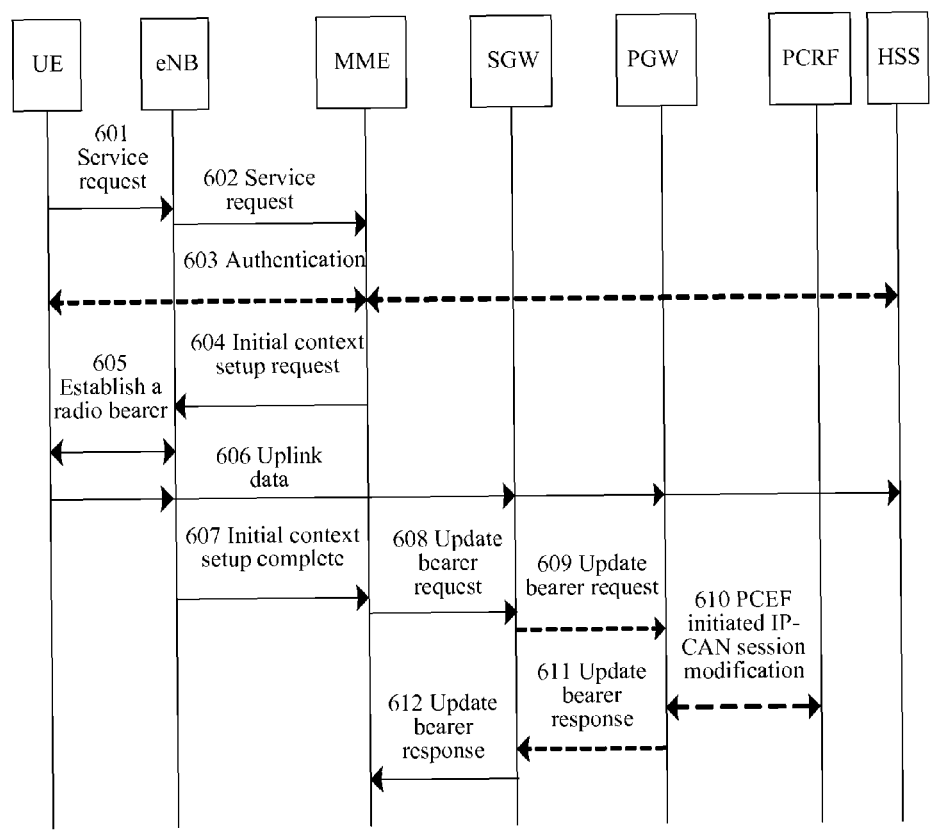
FIG. 6c is a signaling flow chart of the method for reporting radio access network element information applied in a user recovery connection according to the third embodiment of the present invention.

FIG. 6c is a signaling flow chart of the method for reporting radio access network element information applied in a user recovery connection according to the third embodiment of the present invention. As shown in FIG. 6c, when a UE enters an idle state, the UE may be out of contact with an access network, a link between the UE and a radio access network element, for example, an eNB, is disconnected, and when the UE needs to return to a connected state, for example, the UE needs to send data, a control network element MME needs to recover a bearer between the MME and the UE, and delivers reporting policy information to the radio access network element in a process of recovering the bearer. The following steps may be specifically included.

Step 601: A UE initiates a service request (Service Request) message to a radio access network element eNB. In this embodiment, LTE and SAE networks are taken as an example, and this embodiment may also be applied in a UMTS network.

Step 602: The eNB forwards the service request message to a control network element MME.

Step 603: The MME authenticates the UE, where step 604 is performed after the authentication succeeds.

Step 604: The MME sends a bearer setup message, for example, an initial context setup request (Initial Context Setup Request) message, to the eNB, where the bearer setup message carries reporting policy information. The MME may save reporting policy information that corresponds to the eNB and is acquired last time.

Step 605: Establish a radio bearer between the eNB and the UE.

Step 606: The UE sends uplink data to an upper layer network element of a core network through the eNB, where the uplink data needs to be sent.

Step 607 to 612: After the eNB sends an initial context setup complete (Initial Context Setup Complete) message to the MME, the MME may send an update bearer request (Update Bearer Request) message to a PGW through an SGW, and after a PCRF and the PGW perform PCEF initiated IP-CAN session modification (PCEF Initiated IP-CAN Session Modification), the MME receives an update bearer response (Update Bearer Response) message returned by the PGW through the SGW.

In this embodiment, in different radio communication networks and in different application scenarios, reporting policy information, for example, reporting content and a reporting condition, may be configured flexibly, a control network element or a gateway device may deliver the reporting policy information by using bearer setup information, and when the reporting condition is satisfied, the control network element or the gateway device may receive a radio access network element information report that is reported by a radio access network element according to the reporting content, thereby decreasing a network load, reducing occupation of a network resource and reasonably utilizing the network resource.

Figure 7:
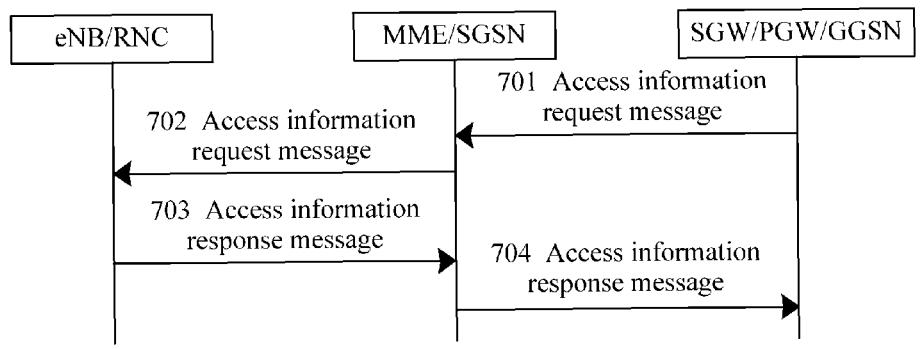
FIG. 7 is a signaling flow chart of using independent signaling to deliver a policy in a method for reporting radio access network element information according to a fourth embodiment of the present invention.

FIG. 7 is a signaling flow chart of using independent signaling to deliver a policy in a method for reporting radio access network element information according to a fourth embodiment of the present invention. As shown in FIG. 7, in LTE and SAE networks or in a UMTS network, reporting policy information may further be delivered through independent signaling, for example, an access information request message (Access information request message). Especially when a radio communication network does not perform a bearer establishment process, reporting policy information may also be delivered through independent signaling.

Step 701: A gateway device SGW/PGW/GGSN sends an access information request message to a control network element MME/SGSN, where the access information request message carries reporting policy information (Access Policy Option).

Step 702: The MME/SGSN forwards the access information request message to a radio access network element eNB/RNC, where the access information request message carries the reporting policy information. To maintain backward compatibility, the access information request message may also be simplified into a message in an existing procedure such as a location report control message to carry the reporting policy information. The representation of a message type is not limited here.

Step 703: After acquiring the reporting policy information from the access information request message, the eNB/RNC returns an access information response message to the MME/SGSN, where the access information response message carries a cause value, and the cause value may indicate whether to accept a policy.

Step 704: The MME/SGSN returns the access information response message to the SGW/PGW/GGSN, where the access information response message carries the cause value.

Step 703 and step 704 are optional steps. Step 702 may not need a response by default, and at this time, step 703 and 704 are not performed. If the MME/SGSN receives a radio access network element information report returned by the eNB/RNC within a certain period of time, a policy is accepted by default; otherwise, a policy is rejected by default.

In this embodiment, in different radio communication networks and in different application scenarios, reporting policy information, for example, reporting content and a reporting condition, may be configured flexibly, a control network element or a gateway device may deliver reporting policy information by using independent signaling, for example, an access information request message, and when the reporting condition is satisfied, the control network element or the gateway device may receive a radio access network element information report that is reported by a radio access network element according to the reporting content, thereby decreasing a network load, reducing occupation of a network resource and reasonably utilizing the network resource.

Figure 8A:
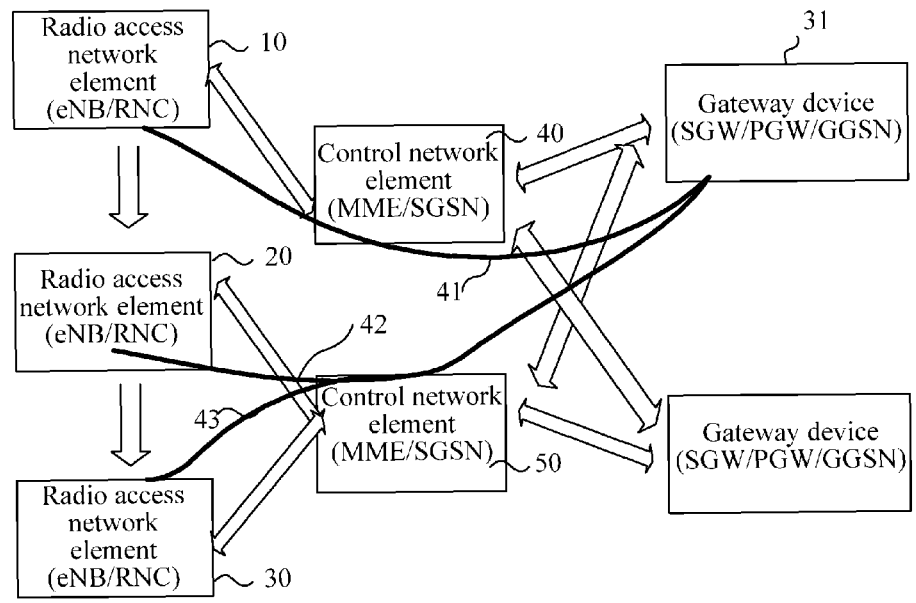
FIG. 8a is an application scenario diagram of using a tunnel to deliver a policy in a method for reporting radio access network element information according to a fifth embodiment of the present invention.

FIG. 8a is an application scenario diagram of using a tunnel to deliver a policy in a method for reporting radio access network element information according to a fifth embodiment of the present invention. As shown in FIG. 8a, a device-level user plane tunnel exists among a radio access network element, a control network element, and a gateway device. It is assumed that the radio access network element hands over, for example, hands over from a radio access network element (eNB/RNC) 10 to a radio access network element (eNB/RNC) 20, which causes that a tunnel needs to hand over. A tunnel 41 before a handover is: the radio access network element (eNB/RNC) 20→a control network element (MME/SGSN) 40→a gateway device (SGW/PGW/GGSN) 31; and a tunnel 42 after the handover is: the radio access network element (eNB/RNC) 20→a control network element (MME/SGSN) 50→the gateway device (SGW/PGW/GGSN) 31. It is assumed that handing over from the radio access network element (eNB/RNC) 20 to a radio access network element (eNB/RNC) 30 is performed, the tunnel needs to hand over from the tunnel 42 to a tunnel 43: the radio access network element (eNB/RNC) 30→the control network element (MME/SGSN) 50→the gateway device (SGW/PGW/GGSN) 31. During a tunnel handover, a new tunnel needs to be re-created.

Figure 8B:
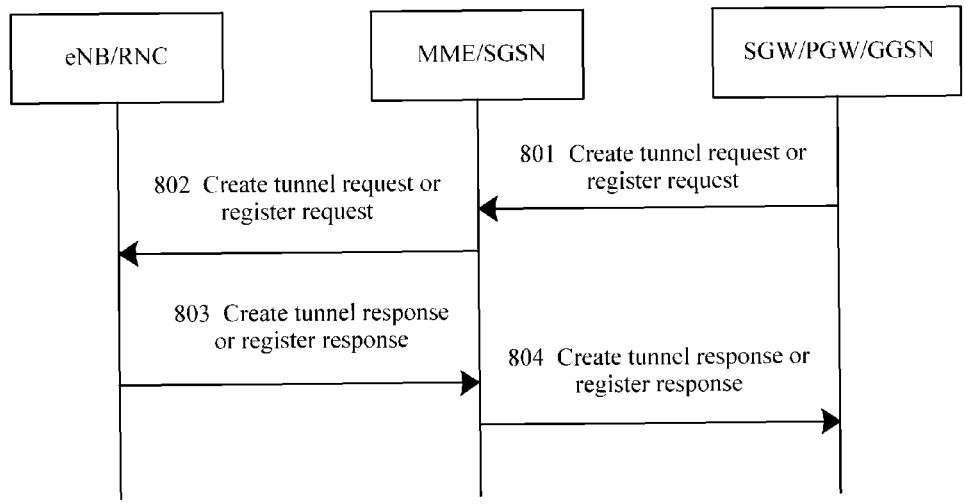
FIG. 8b is a signaling flow chart of using a tunnel to deliver a policy in the method for reporting radio access network element information according to the fifth embodiment of the present invention.

FIG. 8b is a signaling flow chart of using a tunnel to deliver a policy in the method for reporting radio access network element information according to the fifth embodiment of the present invention. When a device-level user plane tunnel is created among a radio access network element, a control network element, and a gateway device, if a first user needs to transfer reporting policy information, the reporting policy information may be transferred when the device-level user plane tunnel is created; and if a second user needs to transfer an access policy message, the access policy message may be transferred in an existing device-level user plane tunnel during user registration. As shown in FIG. 8b, the method for reporting radio access network element information specifically includes:

Step 801: A gateway device SGW/PGW/GGSN sends a create tunnel request (Create Tunnel Request) message to a control network element MME/SGSN during tunnel creation or sends a register request (Register Request) message to a control network element during user registration, where the create tunnel request message or the register request message carries a user identity, for example, an IMSI, and reporting policy information.

Step 802: The control network element MME/SGSN sends, according to the user identity, the create tunnel request message or the register request message to a radio access network element eNB/RNC where a user is located. The create tunnel request message or the register request message carries a user identity, for example, a temporary identity S1AP ID or an IMSI, and reporting policy information. The temporary identity is an identity that represents a user and is allocated to improve security between the control network element and the radio access network element.

Step 803: After acquiring the reporting policy information from the create tunnel request message or the register request message, the radio access network element eNB/RNC may return a corresponding create tunnel response (Create Tunnel Response) message or register response (Register Response) message to the control network element MME/SGSN, where a cause value is carried to indicate whether to accept a policy.

Step 804: The control network element MME/SGSN returns the create tunnel response message or register response message to the gateway device SGW/PGW/GGSN, where the create tunnel response message or register response message carries the cause value.

Step 803 and step 804 are optional steps. Step 802 may not need a response by default, and at this time, step 803 and 804 are not performed. If the MME/SGSN receives a radio access network element information report returned by the eNB/RNC within a certain period of time, a policy is accepted by default; otherwise, a policy is rejected by default.

In this embodiment, in different radio communication networks and in different application scenarios, reporting policy information, for example, reporting content and a reporting condition, may be configured flexibly, a control network element or a gateway device may deliver the reporting policy information by using a tunnel, and when the reporting condition is satisfied, the control network element or the gateway device may receive a radio access network element information report that is reported by a radio access network element according to the reporting content, thereby decreasing a network load, reducing occupation of a network resource and reasonably utilizing the network resource.

Figure 9:
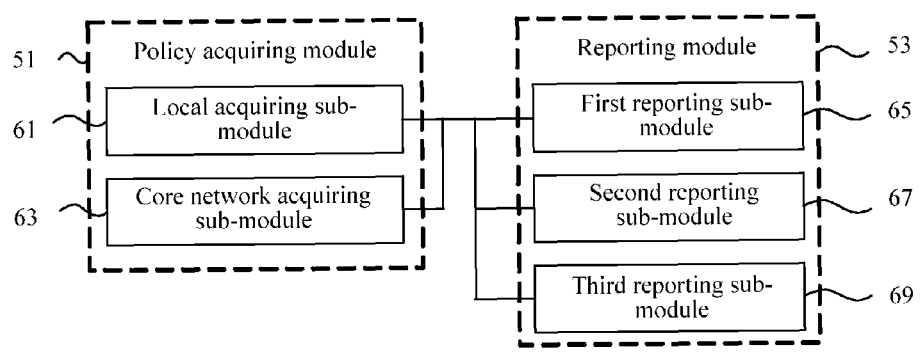
FIG. 9 is a schematic structural diagram of a radio access network element according to an embodiment of the present invention.

FIG. 9 is a schematic structural diagram of a radio access network element according to an embodiment of the present invention. As shown in FIG. 9, the radio access network element may include a policy acquiring module 51 and a reporting module 53.

The policy acquiring module 51 is configured to acquire reporting policy information, where the reporting policy information includes set reporting content and a set reporting condition.

The reporting module 53 is configured to, if the reporting condition is satisfied, report a radio access network element information report to a control network element by using signaling according to the reporting content that includes location information and corresponding time information or report a radio access network element information report to a gateway device by using a tunnel according to the reporting content that includes location information.

Specifically, in a radio communication network, for example, LTE, SAE, or UMTS, after the policy acquiring module 51 of the radio access network element acquires the reporting policy information, the reporting module 53 may report a radio access network element information report to a control network element or a gateway device according to the reporting condition in the reporting policy information, and content in the radio access network element information report may be determined according to the acquired reporting content.

The reporting policy information may be set in the radio access network element, and may also be set in a core network element, for example, a control network element and a gateway device. Therefore, the policy acquiring module 51 may further include a local acquiring sub-module 61 and/or a core network acquiring sub-module 63.

The local acquiring sub-module 61 is configured to acquire the reporting policy information from the radio access network element locally.

The core network acquiring sub-module 63 is configured to acquire the reporting policy information sent by the control network element.

Radio access network elements, control network elements, and gateway devices are different in different radio communication networks. For example, in LTE and SAE networks, the radio access network element may be an evolved base station eNB, the control network element may be a mobility management entity MME, and the gateway device may be a serving gateway SGW or a packet data network gateway PGW; and in a UMTS network, the radio access network element may be a radio network controller RNC, the control network element may be a serving general packet radio service supporting node SGSN, and the gateway device may be a gateway general packet radio service supporting node GGSN. When the reporting policy information is stored in the gateway device, a variety of specific situations that the core network acquiring sub-module 63 may receive, through a control network element of a core network, the reporting policy information sent by the gateway device exist, and reference may be made to the relevant description in the method for reporting radio access network element information according to the first embodiment of the present invention.

In addition, in this embodiment of the present invention, the reporting condition may include reporting at specified time or event-triggering reporting, the reporting content may include location information, time information and/or traffic information, and the reporting policy information may further include a reporting manner, for example, a signaling or tunnel manner. Therefore, the reporting module 53 may include any one or more of the following sub-modules: a first reporting sub-module 65, configured to, if the reporting manner is signaling, send the radio access network element information report to the control network element by using signaling; a second reporting sub-module 67, configured to, if the reporting manner included in the reporting policy information is a user tunnel, send a data packet to the gateway device through a general packet radio service tunneling protocol-user plane tunnel or a mobile IP tunnel, where the data packet carries the radio access network element information report, and the radio access network element information report is set in an extension header or a message type of the data packet; and a third reporting sub-module 69, configured to, if the reporting manner is a device tunnel, send a data packet to the gateway device through a device-level user plane tunnel, where the data packet carries the radio access network element information report, and the data packet further includes a user identity or a corresponding policy identity for creating the device-level user plane tunnel.

In this embodiment, reporting policy information, for example, reporting content and a reporting condition, may be configured flexibly according to a scenario, after a policy acquiring module acquires the reporting policy information, each sub-module of a reporting module may further select, according to the reporting policy information, to use a signaling or tunnel reporting manner, and when the reporting condition is satisfied, a radio access network element information report may be reported to a control network element or a gateway device according to the reporting content, thereby reasonably utilizing a network resource, decreasing a network load, and reducing occupation of the network resource.

Figure 10:
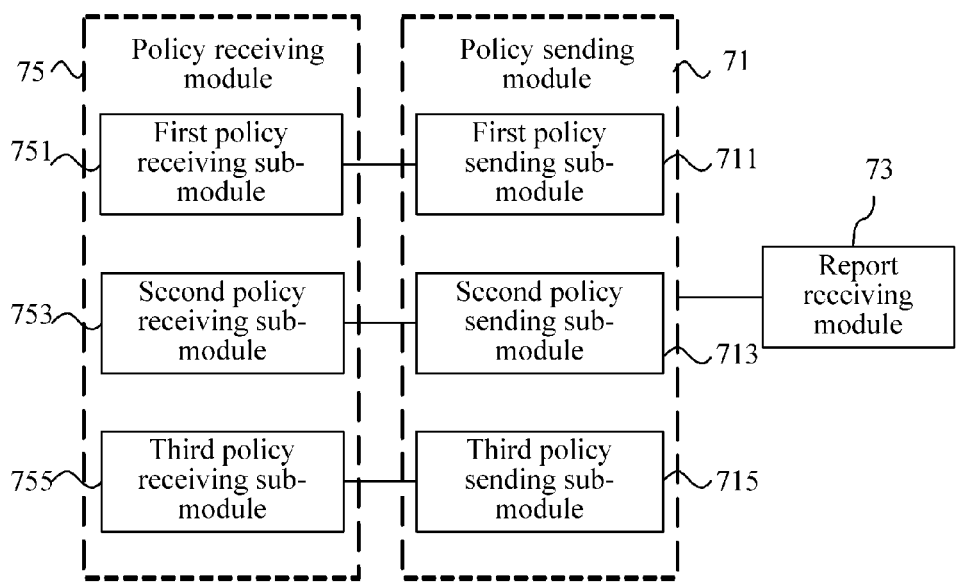
FIG. 10 is a schematic structural diagram of a control network element according to an embodiment of the present invention.

FIG. 10 is a schematic structural diagram of a control network element according to an embodiment of the present invention. As shown in FIG. 10, the control network element may include a policy sending module 71 and a report receiving module 73.

The policy sending module 71 is configured to send reporting policy information to a radio access network element, where the reporting policy information includes set reporting content and a set reporting condition.

The report receiving module 73 is configured to, if the reporting condition is satisfied, receive a radio access network element information report that is reported by the radio access network element by using signaling according to the reporting content that includes location information and corresponding time information.

Specifically, in a radio communication network, for example, LTE, SAE, or UMTS, a core network element may include a control network element and a gateway device. The policy sending module 71 of the control network element may send reporting policy information to a radio access network element, and if a reporting condition is satisfied, the report receiving module 73 may receive a radio access network element information report that includes location information and corresponding time information, is determined according to reporting content, and is returned by the radio access network element, where the radio access network element information report may further include traffic information and so on, and the radio access network element information report may be sent in a signaling manner. Since the reporting policy information may be saved in the control network element, and may also be saved in the gateway device and sent by the gateway device to the control network element, and therefore, the control network element may further include: a policy receiving module 75, configured to receive the reporting policy information sent by the gateway device.

Radio access network elements, control network elements, and gateway devices are different in different radio communication networks. For example, in LTE and SAE networks, the radio access network element may be an evolved base station eNB, the control network element may be a mobility management entity MME, and the gateway device may be a serving gateway SGW or a packet data network gateway PGW; and in a UMTS network, the radio access network element may be a radio network controller RNC, the control network element may be a serving general packet radio service supporting node SGSN, and the gateway device may be a gateway general packet radio service supporting node GGSN. When the reporting policy information is stored in the gateway device, a variety of specific situations that the reporting policy information sent by the gateway device may be received through the control network element exist, and reference may be made to the relevant description in the method for reporting radio access network element information according to the third embodiment of the present invention. Correspondingly, the policy receiving module 75 may include any one or more of the following sub-modules: a first policy receiving sub-module 751, configured to receive a bearer setup message that carries the reporting policy information and is sent by the gateway device, where if the gateway device is the serving gateway or the packet data network gateway, the bearer setup message is a create session response message; and if the gateway device is the gateway general packet radio service supporting node, the bearer setup message is a create packet data protocol context response message; a second policy receiving sub-module 753, configured to receive an access information request message that carries the reporting policy information and is sent by the gateway device, where the gateway device includes a serving gateway, a packet data network gateway, or a gateway general packet radio service supporting node; and a third policy receiving sub-module 755, configured to receive a create tunnel request message or a register request message, where the create tunnel request message or the register request message is sent by the gateway device and carries a user identity and the reporting policy information, and the gateway device includes a serving gateway, a packet data network gateway, or a gateway general packet radio service supporting node.

After receiving the reporting policy information sent by the gateway device, the policy receiving module 75 sends the reporting policy information to the radio access network element through the policy sending module 71. Correspondingly, the policy sending module 71 may include any one or more of the following sub-modules: a first policy sending sub-module 711, configured to forward a bearer setup message to the radio access network element, where the bearer setup message carries the reporting policy information, if the radio access network element is an evolved base station, the bearer setup message is an initial context setup request message, and if the radio access network element is a radio network controller, the bearer setup message is a radio access bearer setup request message; a second policy sending sub-module 713, configured to forward an access information request message to the radio access network element, where the access information request message carries the reporting policy information, and the radio access network element includes an evolved base station or a radio network controller; and a third policy sending sub-module 715, configured to forward a create tunnel request message or a register request message to the radio access network element, where the create tunnel request message or the register request message carries a user identity and the reporting policy information, and the radio access network element includes an evolved base station or a radio network controller.

Specifically, when the control network element delivers reporting policy information through a bearer setup message, in LTE and SAE networks, after the first policy receiving sub-module 751 receives a create session response message that carries the reporting policy information and is sent by the gateway general packet radio service supporting node, the first policy sending sub-module 711 forwards an initial context setup request message to the evolved base station, where the initial context setup request message carries the reporting policy information; or, in a UMTS network, after the first policy receiving sub-module 751 receives a create packet data protocol context response message that carries the reporting policy information and is sent by the serving gateway or the packet data network gateway, the first policy sending sub-module 711 forwards a radio access bearer setup request message to the radio network controller, where the radio access bearer setup request message carries the reporting policy information.

When the control network element delivers reporting policy information through independent signaling, after the second policy receiving sub-module 753 receives an access information request message that carries the reporting policy information and is sent by the gateway device such as the serving gateway, the packet data network gateway, or the gateway general packet radio service supporting node, the second policy sending sub-module 713 forwards the access information request message to the evolved base station or the radio network controller, where the access information request message carries the reporting policy information.

When the control network element delivers reporting policy information through a tunnel, after the third policy receiving sub-module 755 receives a create tunnel request message or a register request message, where the create tunnel request message or the register request message carries a user identity and reporting policy information and is sent by the gateway device such as the serving gateway, the packet data network gateway, or the gateway general packet radio service supporting node, the third policy sending sub-module 715 forwards the create tunnel request message or the register request message to the evolved base station or the radio network controller.

In this embodiment, reporting policy information, for example, reporting content and a reporting condition, may be configured flexibly according to a scenario, and after a policy sending module delivers the reporting policy information to a radio access network element, when the reporting condition is satisfied, a report receiving module may receive a radio access network element information report that is reported by the radio access network element according to the reporting content, thereby reasonably utilizing a network resource, decreasing a network load, and reducing occupation of the network resource.

Figure 11:
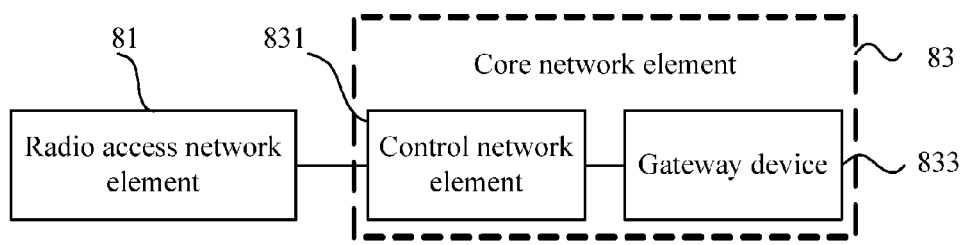
FIG. 11 is a schematic structural diagram of a radio communication network system according to an embodiment of the present invention.

FIG. 11 is a schematic structural diagram of a radio communication network system according to an embodiment of the present invention. As shown in FIG. 11, the radio communication network system may include any one radio access network element 81 in the foregoing embodiments, and further includes core network elements 83.

The core network elements 83 include any one control network element 831 in the foregoing embodiments, and further include a gateway device 833, configured to send reporting policy information to the control network element 831, and receive and process a radio access network element information report that is reported by the radio access network element 81 by using a tunnel according to reporting content that includes location information.

Specifically, the reporting policy information may be preset in the radio access network element 81 or the core network elements 83. If the reporting policy information is set in the radio access network element 81, the radio access network element may acquire the reporting policy information locally, and report the corresponding radio access network element information report to the core network elements according to information such as a reporting condition, reporting content, and a reporting manner in the reporting policy information. If the reporting policy information is set in the core network elements 83, the core network elements 83 may deliver the reporting policy information to the radio access network element 81, and then the radio access network element 81 reports the corresponding radio access network element information report to the core network elements according to information such as a reporting condition, reporting content, and a reporting manner in the reporting policy information. The reporting condition may include reporting at specified time, or event-triggering reporting, and so on, where the event-triggering reporting may include reporting when an event that a bearer is released, a terminal leaves a current location or the terminal enters an idle state occurs. The reporting content may include location information, corresponding time information, traffic information, and so on. The reporting manner may include a signaling or tunnel manner. If the reporting policy information is set in the control network element 831 of the core network elements, the control network element 831 may deliver the reporting policy information to the radio access network element 81 directly. If the reporting policy information is set in the gateway device 833 of the core network elements, the gateway device 833 may deliver the reporting policy information to the radio access network element 81 through the control network element 831. After the radio access network element 81 receives the reporting policy information delivered by the control network element, if the reporting condition is satisfied, specific information in the radio access network element information report may be determined according to the reporting content. If the reporting content includes location information and corresponding time information, the radio access network element information report may include location information of each terminal in the radio access network element and time information of the terminal at a corresponding location. Then, the radio access network element may select a reporting manner, for example, the radio access network element information report may be reported by the control network element 831 to the gateway device 833 in a signaling manner, and the radio access network element information report may also be reported to the gateway device 833 directly in a tunnel manner.

In this embodiment, in this embodiment, reporting policy information, for example, reporting content and a reporting condition, may be configured flexibly according to a scenario, and after a core network element delivers the reporting policy information to a radio access network element, when the reporting condition is satisfied, a radio access network element information report that is reported by the radio access network element according to the reporting content may be received, thereby reasonably utilizing a network resource, decreasing a network load, and reducing occupation of the network resource.

Persons of ordinary skill in the art may understand that all or a part of the steps of the foregoing method embodiments may be implemented by a program instructing relevant hardware. The program may be stored in a computer readable storage medium. When the program runs, the steps of the foregoing method embodiments are performed. The storage medium may be any medium that is capable of storing program codes, such as a ROM, a RAM, a magnetic disk, or an optical disk.

Finally, it should be noted that the foregoing embodiments are only used for describing the technical solutions in the present invention, but are not intended to limit the technical solutions in the present invention. Although the present invention is described in detail with reference to the foregoing embodiments, persons of ordinary skill in the art should understand that modifications may still be made to the technical solutions described in the foregoing embodiments or equivalent substitutions may be made to a part of technical features in the technical solutions; however, these modifications or substitutions do not cause the essence of corresponding technical solutions to depart from the spirit and scope of the technical solutions in the embodiments of the present invention.

What is claimed is:

1. A method for reporting radio access network element information, the method comprising:
   acquiring reporting policy information, wherein the reporting policy information comprises reporting content and a reporting condition;
   determining, by a radio access network element, whether the reporting condition is satisfied, wherein the radio access network element is a network-side device;
   reporting, by the radio access network element, a radio access network element information to a core network element when the reporting condition is satisfied, wherein reporting the radio access network element information to the core network element comprises sending the radio access network element information report either to a control network element using signaling according to the reporting content that comprises location information and corresponding time information or to a gateway device by using a tunnel according to the reporting content that comprises location information; and
   suppressing, by the radio access network element, the radio access network element information when the reporting condition is not satisfied, wherein suppressing the radio access network element information comprises not communicating the radio access network element information report from the radio access network element to the core network element when the reporting condition is not satisfied.

2. The method according to claim 1, wherein reporting the radio access network element information when the reporting condition is satisfied comprises reporting the radio access network element information to the control network element using signaling according to the location information and the corresponding time information specified by the reporting content.

3. The method according to claim 1, wherein reporting the radio access network element information when the reporting condition is satisfied comprises reporting the radio access network element information report to the gateway device using the tunnel according to the location information specified by the reporting content.

4. The method according to claim 1, wherein acquiring the reporting policy information comprises acquiring the reporting policy information from a local storage location of the radio access network element locally.

5. The method according to claim 1, wherein acquiring the reporting policy information comprises acquiring the reporting policy information from the control network element.

6. The method according to claim 1, wherein when handing over from an original radio access network element to a new radio access network element is performed, the method for reporting radio access network element information further comprises:
receiving, by the new radio access network element from an inter-radio network element interface, the reporting policy information sent by the original radio access network element; or
after the original radio access network element sends a handover request message to the control network element, wherein the handover request message carries the reporting policy information, receiving, by the new radio access network element, the handover request message that carries the reporting policy information and is forwarded by the control network element; or
receiving, by the new radio access network element, a request message that carries the reporting policy information and is sent by the control network element, wherein the reporting policy information is reporting policy information of the original radio access network element, wherein the reporting policy information of the original radio access network element is acquired last time and saved by the control network element; or
if the control network element hands over from an original control network element to a new control network element, receiving, by the new radio access network element, an update bearer response message that is sent by the gateway device and forwarded by the new control network element, wherein the update bearer response message carries the reporting policy information.

7. The method according to claim 1, wherein the reporting policy information further comprises a reporting manner and wherein reporting the radio access network element information report comprises any one of the following steps:
if the reporting manner is signaling, sending the radio access network element information report by using the signaling; or
if the reporting manner is a user tunnel, sending a data packet to the gateway device through a general packet radio service tunneling protocol-user plane tunnel or a mobile IP tunnel, wherein the data packet carries the radio access network element information report, and the radio access network element information report is set in an extension header or a message type of the data packet; or
if the reporting manner is a device tunnel, sending a data packet to the gateway device through a device-level user plane tunnel, wherein the data packet carries the radio access network element information report, and the data packet further comprises a user identity or a corresponding policy identity for creating the device-level user plane tunnel.

8. The method according to claim 1, wherein the reporting condition is satisfied when a counter reaches a specified time interval.

9. The method according to claim 1, wherein the reporting condition is satisfied when a bearer channel is released by the radio access network element.

10. The method of claim 1, wherein the reporting condition is satisfied when a terminal leaves a current location.

11. The method of claim 1, wherein the reporting condition is satisfied when a terminal transitions from an active state to an idle state.

12. A method for reporting radio access network element information, the method comprising:
sending, by a core network element, reporting policy information to a radio access network element, wherein the radio access network element is a network-side device, and wherein the reporting policy information comprises reporting content and a reporting condition; and
receiving a radio access network element information report when the reporting condition is satisfied, the radio access network element information report being reported by the radio access network element using signaling according to the reporting content that comprises location information and corresponding time information or using a tunnel according to the reporting content that comprises location information, and
wherein the radio access network element information is suppressed by the radio access network element when the reporting condition is not satisfied.

13. The method according to claim 12, wherein before sending the reporting policy information to the radio access network element, the method further comprises receiving the reporting policy information sent by a gateway device.

14. The method according to claim 13, wherein the gateway device comprises a serving gateway, a packet data network gateway, or a gateway general packet radio service supporting node, and wherein receiving the reporting policy information sent by the gateway device comprises:
receiving a bearer setup message that carries the reporting policy information from the gateway device, wherein the bearer setup message is a create session response message when the gateway device is the serving gateway or the packet data network gateway, and wherein the bearer setup message is a create packet data protocol context response message when the gateway device is the gateway general packet radio service supporting node; or
receiving an access information request message that carries the reporting policy information from the gateway device; or
receiving a create tunnel request message or a register request message, wherein the create tunnel request message or the register request message is sent by the gateway device, and carries a user identity and the reporting policy information.

15. The method according to claim 12, wherein the radio access network element comprises an evolved base station or a radio network controller, and wherein sending the reporting policy information to the radio access network element comprises:
forwarding a bearer setup message to the radio access network element, wherein the bearer setup message carries the reporting policy information, wherein the bearer setup message is an initial context setup request message when the radio access network element is the evolved base station, and wherein the bearer setup message is a radio access bearer setup request message when the radio access network element is the radio network controller; or
forwarding an access information request message to the radio access network element, wherein the access information request message carries the reporting policy information; or
forwarding a create tunnel request message or a register request message to the radio access network element, wherein the create tunnel request message or the register request message carries a user identity and the reporting policy information.

16. A radio access network element, comprising:
a processor; and
a computer readable storage medium storing programming for execution by the processor, the programming including instructions to:
  acquire reporting policy information, wherein the reporting policy information comprises reporting content and a reporting condition;
  determine, at the radio access network element, whether the reporting condition is satisfied, wherein the radio access network element is a network-side device;
  to report a radio access network element information report from the radio access network element to a core network element when the reporting condition is satisfied, wherein the instructions to report the radio access network element information to the core network element include instructions to send the radio access network element information report either to a control network element using signaling according to the reporting content that comprises location information and corresponding time information or to a gateway device using a tunnel according to the reporting content that comprises location information; and
  suppress the radio access network element information when the reporting condition is not satisfied, wherein the instructions to suppress the radio access network element information include instructions to not communicate the radio access network element information report from the radio access network element to the core network element when the reporting condition is not satisfied.

17. The radio access network element according to claim 16, wherein the instructions to acquire reporting policy information further include instructions to:
  acquire the reporting policy information from a local storage location of the radio access network element locally, from the control network element, or from both.

18. The radio access network element according to claim 16, wherein the reporting policy information further comprises a reporting manner, and wherein the programming further includes instructions to:
  if the reporting manner is signaling, send the radio access network element information report to the control network element by using the signaling;
  if the reporting manner is a user tunnel, send a data packet to the gateway device through a general packet radio service tunneling protocol-user plane tunnel or a mobile IP tunnel, wherein the data packet carries the radio access network element information report, and the radio access network element information report is set in an extension header or a message type of the data packet; and
  if the reporting manner is a device tunnel, send a data packet to the gateway device through a device-level user plane tunnel, wherein the data packet carries the radio access network element information report, and the data packet further comprises a user identity or a corresponding policy identity for creating the device-level user plane tunnel.

19. A control network element, comprising:
a processor; and
a computer readable storage medium storing programming for execution by the processor, the programming including instructions to:
  send reporting policy information to a radio access network element, wherein the radio access network element is a network-side device, and wherein the reporting policy information comprises reporting content and a reporting condition; and
  to receive a radio access network element information report when the reporting condition is satisfied, the radio access network element information report being reported by the radio access network element using signaling according to the reporting content that comprises location information and corresponding time information, and
  wherein the radio access network element information is suppressed by the radio access network element when the reporting condition is not satisfied.

20. The control network element according to claim 19, wherein the programming further includes instructions to receive the reporting policy information sent by a gateway device.

21. The control network element according to claim 20, wherein the instructions to receive the reporting policy information further include one or more of the following instructions
  to receive a bearer setup message that carries the reporting policy information and is sent by the gateway device, wherein if the gateway device is a serving gateway or a packet data network gateway, the bearer setup message is a create session response message, and if the gateway device is a gateway general packet radio service supporting node, the bearer setup message is a create packet data protocol context response message; or
  to receive an access information request message that carries the reporting policy information and is sent by the gateway device, wherein the gateway device comprises a serving gateway, a packet data network gateway, or a gateway general packet radio service supporting node; and
  to receive a create tunnel request message or a register request message, wherein the create tunnel request message or the register request message is sent by the gateway device, and carries a user identity and the reporting policy information, and the gateway device comprises a serving gateway, a packet data network gateway, or a gateway general packet radio service supporting node.

22. The control network element according to claim 19, wherein the instructions to send the reporting policy information to the radio access network element further include one or more of the following instructions:
  to forward a bearer setup message to the radio access network element, wherein the bearer setup message carries the reporting policy information, if the radio access network element is an evolved base station, the bearer setup message is an initial context setup request message, and if the radio access network element is a radio network controller, the bearer setup message is a radio access bearer setup request message;
  to forward an access information request message to the radio access network element, wherein the access information request message carries the reporting policy information, and the radio access network element comprises an evolved base station or a radio network controller; and
  to forward a create tunnel request message or a register request message to the radio access network element, wherein the create tunnel request message or the register request message carries a user identity and the reporting policy information, and the radio access network element comprises an evolved base station or a radio network controller.

23. A radio communication network system, comprising:
a radio access network element; and
a core network element;
wherein the radio access network element is configured to acquire reporting policy information that comprises reporting content and a reporting condition, and to report a radio access network element information report to the core network element when the reporting condition is satisfied, the radio access network element information report being reported to either a control network element using signaling according to the reporting content that comprises location information and corresponding time information or a gateway device using a tunnel according to the reporting content that comprises location information,
wherein the radio access network element is further configured to suppress the radio access network element information report when the reporting condition is not satisfied,
wherein the core network element comprise at least one of a control network element and a gateway device,
wherein the control network element is configured to send the reporting policy information to the radio access network element, and to receive the radio access network element information report when the reporting condition is satisfied, or
wherein the gateway device is configured to send reporting policy information to the control network element, and to receive and process the radio access network element information report that is reported by the radio access network element using the tunnel according to the reporting content that comprises the location information.

* * * * *